(12) United States Patent
Upton

(10) Patent No.: US 7,546,462 B2
(45) Date of Patent: *Jun. 9, 2009

(54) SYSTEMS AND METHODS FOR INTEGRATION ADAPTER SECURITY

(75) Inventor: Mitch Upton, Highlands Ranch, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 543 days.

This patent is subject to a terminal disclaimer.

(21) Appl. No.: 10/271,215

(22) Filed: Oct. 15, 2002

(65) Prior Publication Data

US 2003/0097574 A1  May 22, 2003

Related U.S. Application Data

(60) Provisional application No. 60/347,919, filed on Oct. 18, 2001, provisional application No. 60/347,901, filed on Oct. 18, 2001.

(51) Int. Cl.
*G06F 7/04* (2006.01)
*H04L 9/00* (2006.01)

(52) U.S. Cl. .......................... 713/170; 726/4
(58) Field of Classification Search ......... 713/153–200; 380/201, 203, 209; 705/57; 709/26; 726/4
See application file for complete search history.

(56) References Cited

U.S. PATENT DOCUMENTS

| 5,321,841 A | 6/1994 | East et al. ................. 395/725 |
|---|---|---|
| 5,469,562 A | 11/1995 | Saether |
| 5,604,860 A | 2/1997 | McLaughlin et al. |
| 5,630,131 A | 5/1997 | Palevich et al. |
| 5,748,975 A | 5/1998 | Van De Vanter ............ 395/793 |
| 5,801,958 A | 9/1998 | Dangelo et al. |
| 5,835,769 A | 11/1998 | Jervis et al. ................. 395/701 |
| 5,836,014 A | 11/1998 | Faiman, Jr. ................. 395/707 |
| 5,862,327 A | 1/1999 | Kwang et al. .......... 395/200.33 |
| 5,867,822 A | 2/1999 | Sankar |
| 5,933,838 A | 8/1999 | Lomet ........................ 707/202 |
| 5,944,794 A | 8/1999 | Okamoto et al. |
| 5,950,010 A | 9/1999 | Hesse et al. ................. 395/712 |

(Continued)

FOREIGN PATENT DOCUMENTS

CA          2248634          3/2000

(Continued)

OTHER PUBLICATIONS

Pekka Sjoberg; The Java Message Service 1.0.2; 2001.*

(Continued)

*Primary Examiner*—Nasser G Moazzami
*Assistant Examiner*—Mohammad W Reza
(74) *Attorney, Agent, or Firm*—Fliesler Meyer LLP

(57) ABSTRACT

An application view, which can represent a self-describing interface to functionality in a resource such as an application or enterprise system, can configure a security principal for a validated system user. A resource adapter can receive the request from the application view and can use a security principal map to map the security principal to a resource-appropriate principal. The resource adapter can perform a resource sign-on in a manner specific to the resource using the resource-appropriate principal.

19 Claims, 6 Drawing Sheets

U.S. PATENT DOCUMENTS

| | | | |
|---|---|---|---|
| 5,961,593 A | 10/1999 | Gabber et al. ............... 709/219 |
| 5,966,535 A | 10/1999 | Benedikt et al. |
| 6,012,083 A | 1/2000 | Savitzky et al. |
| 6,016,495 A | 1/2000 | McKeehan et al. |
| 6,018,730 A | 1/2000 | Nichols et al. |
| 6,023,578 A | 2/2000 | Birsan et al. |
| 6,028,997 A | 2/2000 | Leymann et al. |
| 6,029,000 A | 2/2000 | Woolsey et al. |
| 6,044,217 A | 3/2000 | Brealey et al. ............... 395/701 |
| 6,067,623 A * | 5/2000 | Blakley, III et al. ............ 726/5 |
| 6,070,184 A | 5/2000 | Blount et al. |
| 6,085,030 A | 7/2000 | Whitehead et al. ..... 395/200.33 |
| 6,092,102 A | 7/2000 | Wagner |
| 6,119,149 A | 9/2000 | Notani ........................ 709/205 |
| 6,125,363 A | 9/2000 | Buzzeo et al. |
| 6,141,686 A | 10/2000 | Jackowski et al. .......... 709/224 |
| 6,141,701 A | 10/2000 | Whitney |
| 6,148,336 A | 11/2000 | Thomas et al. |
| 6,154,738 A | 11/2000 | Call |
| 6,185,734 B1 | 2/2001 | Saboff et al. |
| 6,189,044 B1 | 2/2001 | Thomson et al. |
| 6,212,546 B1 | 4/2001 | Starkovich et al. |
| 6,222,533 B1 | 4/2001 | Notani et al. ................ 345/329 |
| 6,226,675 B1 | 5/2001 | Meltzer et al. |
| 6,226,788 B1 | 5/2001 | Schoening et al. |
| 6,230,287 B1 | 5/2001 | Pinard et al. .................. 714/31 |
| 6,230,309 B1 | 5/2001 | Turner et al. .................... 717/1 |
| 6,237,135 B1 | 5/2001 | Timbol ............................ 717/1 |
| 6,243,737 B1 | 6/2001 | Flanagan et al. |
| 6,256,676 B1 | 7/2001 | Taylor et al. |
| 6,269,373 B1 | 7/2001 | Apte et al. |
| 6,282,711 B1 | 8/2001 | Halpern et al. ................ 717/11 |
| 6,292,932 B1 | 9/2001 | Baisley et al. |
| 6,311,327 B1 | 10/2001 | O'Brrien et al. |
| 6,324,681 B1 | 11/2001 | Sebesta et al. .................. 717/1 |
| 6,330,569 B1 | 12/2001 | Baisley et al. |
| 6,334,114 B1 | 12/2001 | Jacobs et al. |
| 6,336,122 B1 | 1/2002 | Lee et al. ..................... 707/204 |
| 6,338,064 B1 | 1/2002 | Ault et al. ....................... 707/9 |
| 6,343,265 B1 | 1/2002 | Glebov et al. |
| 6,345,283 B1 | 2/2002 | Anderson |
| 6,348,970 B1 | 2/2002 | Marx |
| 6,349,408 B1 | 2/2002 | Smith ........................... 717/11 |
| 6,353,923 B1 | 3/2002 | Bogle et al. ..................... 717/4 |
| 6,356,906 B1 | 3/2002 | Lippert et al. |
| 6,360,221 B1 | 3/2002 | Gough et al. |
| 6,360,358 B1 | 3/2002 | Elsbree et al. |
| 6,367,068 B1 | 4/2002 | Vaidyanathan et al. |
| 6,377,939 B1 | 4/2002 | Young |
| 6,393,605 B1 | 5/2002 | Loomans ..................... 717/121 |
| 6,408,311 B1 | 6/2002 | Baisley et al. |
| 6,411,698 B1 | 6/2002 | Bauer et al. |
| 6,438,594 B1 | 8/2002 | Bowman-Amuah |
| 6,445,711 B1 | 9/2002 | Scheel et al. |
| 6,463,503 B1 | 10/2002 | Jones et al. .................. 711/114 |
| 6,470,364 B1 | 10/2002 | Prinzing |
| 6,516,322 B1 | 2/2003 | Meredith |
| 6,549,949 B1 | 4/2003 | Bowman-Amuah ......... 709/236 |
| 6,560,769 B1 | 5/2003 | Moore et al. |
| 6,567,738 B2 | 5/2003 | Gopp et al. |
| 6,584,454 B1 * | 6/2003 | Hummel et al. ............... 705/59 |
| 6,594,693 B1 | 7/2003 | Borwankar ................. 709/219 |
| 6,594,700 B1 | 7/2003 | Graham et al. |
| 6,601,113 B1 | 7/2003 | Koistinen et al. |
| 6,604,198 B1 | 8/2003 | Beckman et al. ............ 713/167 |
| 6,609,115 B1 * | 8/2003 | Mehring et al. ............... 705/51 |
| 6,615,258 B1 * | 9/2003 | Barry et al. ................. 709/223 |
| 6,636,491 B1 | 10/2003 | Kari et al. |
| 6,637,020 B1 | 10/2003 | Hammond |
| 6,643,652 B2 | 11/2003 | Helgeson et al. |
| 6,654,932 B1 | 11/2003 | Bahrs et al. |
| 6,662,357 B1 | 12/2003 | Bowman-Amuah |
| 6,678,518 B2 | 1/2004 | Eerola |
| 6,684,388 B1 | 1/2004 | Gupta et al. |
| 6,687,702 B2 | 2/2004 | Vaitheeswaran et al. |
| 6,687,848 B1 | 2/2004 | Najmi |
| 6,721,740 B1 | 4/2004 | Skinner et al. |
| 6,721,779 B1 | 4/2004 | Maffeis |
| 6,732,237 B1 | 5/2004 | Jacobs et al. ................ 711/119 |
| 6,738,975 B1 | 5/2004 | Yee et al. |
| 6,748,420 B1 | 6/2004 | Quatrano et al. |
| 6,754,884 B1 | 6/2004 | Lucas et al. |
| 6,757,689 B2 | 6/2004 | Battas et al. |
| 6,789,054 B1 | 9/2004 | Makhlouf |
| 6,795,967 B1 | 9/2004 | Evans et al. ................. 719/310 |
| 6,799,718 B2 | 10/2004 | Chan et al. |
| 6,802,000 B1 | 10/2004 | Greene et al. ............... 713/168 |
| 6,804,686 B1 | 10/2004 | Stone et al. ............... 707/104.1 |
| 6,823,495 B1 | 11/2004 | Vedula et al. |
| 6,832,238 B1 | 12/2004 | Sharma et al. |
| 6,836,883 B1 | 12/2004 | Abrams et al. |
| 6,847,981 B2 | 1/2005 | Song et al. |
| 6,850,979 B1 | 2/2005 | Saulpaugh et al. |
| 6,859,180 B1 | 2/2005 | Rivera |
| 6,874,143 B1 | 3/2005 | Murray et al. |
| 6,877,023 B1 | 4/2005 | Maffeis et al. |
| 6,889,244 B1 | 5/2005 | Gaither et al. |
| 6,915,519 B2 | 7/2005 | Williamson et al. |
| 6,918,084 B1 | 7/2005 | Slaughter et al. |
| 6,922,827 B2 | 7/2005 | Vasilik et al. |
| 6,950,872 B2 | 9/2005 | Todd, II |
| 6,957,199 B1 * | 10/2005 | Fisher ........................... 705/78 |
| 6,959,307 B2 | 10/2005 | Apte |
| 6,959,336 B2 * | 10/2005 | Moreh et al. ................ 709/229 |
| 6,959,340 B1 | 10/2005 | Najmi |
| 6,963,914 B1 | 11/2005 | Breitbart et al. |
| 6,971,096 B1 | 11/2005 | Ankireddipally et al. |
| 6,976,086 B2 | 12/2005 | Sadeghi et al. |
| 6,981,043 B2 * | 12/2005 | Botz et al. ................... 709/225 |
| 6,999,912 B2 * | 2/2006 | Loisey et al. ................... 703/21 |
| 7,000,219 B2 | 2/2006 | Barrett et al. |
| 7,017,146 B2 | 3/2006 | Dellarocas et al. |
| 7,043,722 B2 | 5/2006 | Bau, II |
| 7,051,072 B2 | 5/2006 | Stewart et al. |
| 7,051,316 B2 | 5/2006 | Charisius et al. |
| 7,054,858 B2 | 5/2006 | Sutherland |
| 7,062,718 B2 | 6/2006 | Kodosky et al. |
| 7,069,507 B1 | 6/2006 | Alcazar et al. |
| 7,072,934 B2 | 7/2006 | Helgeson et al. |
| 7,073,167 B2 | 7/2006 | Iwashita |
| 7,076,772 B2 | 7/2006 | Zatloukal |
| 7,089,584 B1 | 8/2006 | Sharma |
| 7,096,422 B2 | 8/2006 | Rothschiller et al. |
| 7,107,578 B1 | 9/2006 | Alpern |
| 7,111,243 B1 | 9/2006 | Ballard et al. |
| 7,117,504 B2 | 10/2006 | Smith et al. |
| 7,127,704 B2 | 10/2006 | Van De Vanter et al. |
| 7,134,072 B1 | 11/2006 | Lovett et al. |
| 7,143,186 B2 | 11/2006 | Stewart et al. |
| 7,146,422 B1 | 12/2006 | Marlatt et al. |
| 7,155,705 B1 | 12/2006 | Hershberg et al. |
| 7,165,041 B1 | 1/2007 | Guheen et al. |
| 7,181,731 B2 | 2/2007 | Pace et al. |
| 7,184,967 B1 | 2/2007 | Mital et al. |
| 7,231,421 B2 | 6/2007 | Kawakura |
| 7,240,331 B2 | 7/2007 | Vion-Dury et al. |
| 7,260,599 B2 | 8/2007 | Bauch et al. |
| 7,260,818 B1 | 8/2007 | Iterum et al. |
| 7,406,664 B1 | 7/2008 | Morton et al. |
| 2001/0032263 A1 | 10/2001 | Gopal et al. |
| 2002/0004848 A1 | 1/2002 | Sudarshan et al. |
| 2002/0010781 A1 | 1/2002 | Tuatini |
| 2002/0010803 A1 | 1/2002 | Oberstein et al. |
| 2002/0016759 A1 | 2/2002 | Marcready et al. |

| | | |
|---|---|---|
| 2002/0029269 A1* | 3/2002 | McCarty et al. ............ 709/225 |
| 2002/0035604 A1 | 3/2002 | Cohen et al. |
| 2002/0038336 A1 | 3/2002 | Abileah et al. |
| 2002/0049788 A1 | 4/2002 | Lipkin et al. |
| 2002/0073080 A1 | 6/2002 | Lipkin |
| 2002/0073396 A1 | 6/2002 | Crupi et al. |
| 2002/0078365 A1 | 6/2002 | Burnette et al. |
| 2002/0083075 A1 | 6/2002 | Brummel et al. |
| 2002/0111922 A1 | 8/2002 | Young et al. |
| 2002/0116454 A1 | 8/2002 | Dyla et al. |
| 2002/0120685 A1 | 8/2002 | Srivastava et al. |
| 2002/0138582 A1 | 9/2002 | Chandra et al. |
| 2002/0143960 A1 | 10/2002 | Goren et al. |
| 2002/0152106 A1 | 10/2002 | Stoxen et al. |
| 2002/0152244 A1 | 10/2002 | Dean et al. |
| 2002/0161826 A1 | 10/2002 | Arteaga et al. |
| 2002/0165936 A1 | 11/2002 | Alston et al. |
| 2002/0169644 A1 | 11/2002 | Greene |
| 2002/0174178 A1 | 11/2002 | Stawikowski |
| 2002/0174241 A1 | 11/2002 | Beged-Dov et al. |
| 2002/0184145 A1 | 12/2002 | Sijacic et al. |
| 2002/0184610 A1 | 12/2002 | Chong et al. |
| 2002/0188486 A1 | 12/2002 | Gil et al. |
| 2002/0188513 A1 | 12/2002 | Gil et al. |
| 2002/0194221 A1 | 12/2002 | Strong et al. |
| 2002/0194244 A1 | 12/2002 | Raventos |
| 2002/0194267 A1 | 12/2002 | Flesner et al. |
| 2002/0194495 A1 | 12/2002 | Gladstone et al. |
| 2003/0004746 A1 | 1/2003 | Kheirolomoom et al. |
| 2003/0005181 A1 | 1/2003 | Bau, III et al. |
| 2003/0014439 A1 | 1/2003 | Boughannam |
| 2003/0014656 A1* | 1/2003 | Ault et al. ................... 713/200 |
| 2003/0018661 A1 | 1/2003 | Darugar |
| 2003/0018665 A1 | 1/2003 | Dovin et al. |
| 2003/0018832 A1 | 1/2003 | Amirisetty et al. |
| 2003/0018963 A1 | 1/2003 | Ashworth et al. |
| 2003/0023957 A1 | 1/2003 | Bau et al. |
| 2003/0028364 A1 | 2/2003 | Chan et al. |
| 2003/0028579 A1 | 2/2003 | Kulkarni et al. |
| 2003/0041050 A1 | 2/2003 | Smith et al. |
| 2003/0041198 A1 | 2/2003 | Exton et al. |
| 2003/0043191 A1 | 3/2003 | Tinsley et al. |
| 2003/0046266 A1 | 3/2003 | Mullins et al. |
| 2003/0046591 A1 | 3/2003 | Asghari-Kamrani et al. |
| 2003/0051063 A1 | 3/2003 | Skufca et al. |
| 2003/0051066 A1 | 3/2003 | Pace et al. |
| 2003/0055868 A1 | 3/2003 | Fletcher et al. |
| 2003/0055878 A1 | 3/2003 | Fletcher et al. |
| 2003/0065827 A1 | 4/2003 | Skufca et al. |
| 2003/0069975 A1 | 4/2003 | Abjanic et al. |
| 2003/0074217 A1 | 4/2003 | Beisiegel et al. |
| 2003/0074467 A1 | 4/2003 | Oblak et al. |
| 2003/0079029 A1 | 4/2003 | Garimella et al. |
| 2003/0084203 A1 | 5/2003 | Yoshida et al. |
| 2003/0110117 A1 | 6/2003 | Saidenberg et al. |
| 2003/0110446 A1 | 6/2003 | Nemer |
| 2003/0126136 A1 | 7/2003 | Omoigui |
| 2003/0149791 A1 | 8/2003 | Kane et al. |
| 2003/0167358 A1 | 9/2003 | Marvin et al. |
| 2003/0196168 A1 | 10/2003 | Hu |
| 2003/0233631 A1 | 12/2003 | Curry |
| 2004/0019645 A1 | 1/2004 | Goodman et al. |
| 2004/0040011 A1 | 2/2004 | Bosworth et al. |
| 2004/0068568 A1 | 4/2004 | Griffin |
| 2004/0078373 A1 | 4/2004 | Ghoneimy et al. |
| 2004/0103406 A1 | 5/2004 | Patel |
| 2004/0133660 A1 | 7/2004 | Junghuber et al. |
| 2004/0148336 A1 | 7/2004 | Hubbard et al. |
| 2004/0204976 A1 | 10/2004 | Oyama et al. |
| 2004/0216086 A1 | 10/2004 | Bau |
| 2004/0225995 A1 | 11/2004 | Marvin et al. |
| 2004/0260715 A1 | 12/2004 | Mongeon et al. |
| 2005/0050068 A1 | 3/2005 | Vaschillo et al. |
| 2005/0223392 A1 | 10/2005 | Cox et al. |
| 2005/0256935 A1 | 11/2005 | Overstreet et al. |
| 2005/0278585 A1 | 12/2005 | Spencer |
| 2006/0085797 A1 | 4/2006 | Connelly |
| 2006/0206856 A1 | 9/2006 | Breeden et al. |
| 2006/0234678 A1 | 10/2006 | Juitt et al. |
| 2007/0038500 A1 | 2/2007 | Hammitt et al. |

FOREIGN PATENT DOCUMENTS

| | | |
|---|---|---|
| EP | 1 006 443 A2 | 6/2000 |
| EP | 1 061 445 A2 | 12/2000 |
| WO | WO9923558 | 5/1999 |
| WO | WO 00/29924 | 5/2000 |
| WO | 01/90884 A2 | 11/2001 |

OTHER PUBLICATIONS

U.S. Appl. No. 10/271,047, filed Oct. 15, 2002, Mitch Upton.
U.S. Appl. No. 10/271,156, filed Oct. 15, 2002, Mitch Upton.
U.S. Appl. No. 10/271,157, filed Oct. 15, 2002, Mitch Upton.
U.S. Appl. No. 10/271,162, filed Oct. 15, 2002, Mitch Upton.
U.S. Appl. No. 10/271,194, filed Oct. 15, 2002, Mitch Upton.
U.S. Appl. No. 10/271,244, filed Oct. 15, 2002, Mitch Upton.
U.S. Appl. No. 10/271,402, filed Oct. 15, 2002, Mitch Upton.
U.S. Appl. No. 10/271,410, filed Oct. 15, 2002, Mitch Upton.
U.S. Appl. NO. 10/271,414, filed Oct. 15, 2002, Mitch Upton.
U.S. Appl. No. 10/271,423, filed Oct. 15, 2002, Mitch Upton.
Sun Microsystems, *IPlanet Application Server 6.0 White Paper*, iPlanet E-Commerce Solutions, May 25, 2000, pp. 1-104.
Enrique Duvos & Azer Bestavros, *An Infrastructure for the Dynamic Distribution of Web Application and Services*, Department of Computer Science Boston University, Dec. 2000, pp. 1-22.
Ed Roman & Rickard Öberg, *The Technical Benefits of EJB and J2EE Technologies over COM+ and Windows DNA*, Enterprise Edition (J2EE) Technologies, Dec. 1999, pp. 1-24.
Marcello Mariucci, *Enterprise Application Server Development Environments*, University of Stuttgart, Oct. 10, 2000, pp. 1-30.
C. Moran et al. "ARIES: A Transaction Recovery Method Supporting Fine-Granularity Locking and Partial Rollbacks Using Write-Ahead Logging", ACM Transaction on Database Systems, vol. 17, No. 1, Mar. 1992, pp. 94-162.
"Introducing Microsoft DotNet"; by ChristopheLauer, Jul. 2, 2002; http://web.archive.org/web/20020702162429/http://www.freevbcode.com/ShowCode.asp?ID=2171; pp. 1-10.
Paul, Laura Gibbone, "RosettaNet: Teaching business to work together", Oct. 1, 1999. http://www.developer.com/xml/article.php/616641.
Blake, Ruled-Driven Coordination Agent: "A Self-Configureable Agent Architecture for Distributed Control"; IEEE Mar. 2001, pp. 271-277.
Dahalin et al., Workflow Interoperability Using Extensible Markup Language (XML), IEEE, Jul. 2002, pp. 513-516.
Kunisetty "Workflow Modeling and simulation Using an Extensible Object-Oriented Knowledge Base Management System" Citeseer, 1996, pp. 1-60.
Van Der Aalst et al., Verification of XRL: An XML-Based Workflow Language, IEEE, Jul. 2001, pas. 427-432.
Sosnoski, "XML and Java Technologies: Data Binding, Part 1: Code Generation Approaches—JAXB and more", IBM, pp. 1-11, 2003.
Erich Liebmann et al., "Adaptive Data Dissemination and Caching for Edge Service Architectures Built wi the J2EE", Mar. 2004, ACM Press ACM Symposium on Applied Computer, pp. 1717-1724.
Chen et al., "eCo Architecture for Electronic Commerce Interoperability", Jun. 29, 1999, CommerceNet, pp. 1-107.
JAVA™ Debug Interface, definitions, retrieved from <URL http://java.sun.com/j2se/1.4.2/docs/guide/jpda/jdi/overview-summary.html, Feb. 21, 2007.
Embury et al., "Assisting the Comprehension of Legacy Transaction", Reverse Engineering, 2001, Proceedings, Eighth Working Conference on Oct. 2-5, 2001, pp. 345-354.
Mays et al., "A Persistent Store for Large Shared Knowledge Bases", Knowledge and Data Engineering, IEEE Transactions on vol. 3, Issue 1, Mar. 1991, pp. 33-41.

Tang et al., "Integrating Remote Invocation and Distributed Shared State", Parallel and Distributed Processing Symposium, 2004, Proceedings, 18th International, Apr. 26-30, 2004, (10 pages).

Kilgore, "Multi-Language, Open-Source Modeling Using the Microsoft Architecture", Simulation Conference, 2002, Proceedings of the Winter, Dec. 8-11, 2002, vol. 1, pp. 629-633.

Bogunovic, "A Programming Model for Composing Data Flow Collaborative Applications", Proceedings of the IEEE International Conference on Engineering of Computer Based Systems, Mar. 7-12, 1999, pp. 106-112.

Sung et al., "A Multimedia Authoring Tool for the Internet", IEEE Transactions on Consumer Electronics, 1997. pp. 304-308.

Smith, et al. "Marching Towards a Software Reuse Future", ACM Ada Letters, Nov./Dec. 1994, pp. 62-72 vol. 14, No. 6.

Stylus Studio, "Xquery Mapper", 2007, 6 pages, Stylus Studios.

Altova, "XML-to-XML Mapping", 2007, 3 pages, Altova Map Force.

Jamper, "Jamper-Java XML Mapper", 2007, 4 pages, Sourceforge.

Van Der Aalst et al., "Verification of XRL: An XML-based Workflow Language", IEEE, Jul. 2001, The Sixth International Conference on Computer Supported Cooperative Work in Design, pp. 427-432.

Alonso et al., "Advanced Transaction Models in Workflow Contexts", IEEE, Feb. 1996, Proceedings of 12th International Conference on Data Engineering, retrieved from: http://citeseer.ist.psu.edualonso96advanced.html., pp. 574-581.

Plaindoux, "XML transducers in Java", May 2002, The Eleventh International World Wide Conference, retrieved from: http://www2002.org/CDROM/poster/132/index.html., 6 pages.

HP, "HP Application Server Developer's Guide," Version 8.0, Hewlett-Packard Company, 1999-2001, pp. 27-81, 127-160, 195-271.

BEA Systems, Inc., "Transforming Data Using Xquery Mapper", BEA AquaLogic Service Bus 2.0 Documentation, 2006, 19 pages.

European Search Report Dated Aug. 8, 2007 in connection with Application No. 02784131.1, 4 pages.

Allamaraju, et al., Professional Java Server Programming J2EE 1.3 Edition, Sep. 2001, 24 pages.

Sun Microsystems, "J2EE Connector Architecture 1.0", Aug. 2001, 90 pages.

Microsoft, "Microsoft.net Framework", 2001, Microsoft Corporation, 54 pages.

Wilink, Metal-Compilation for C++, Jan. 2000, University of Surrey, 379 pages.

Muller, "Event-Oriented Dynamic Adaptation of Workflows: Model, Architecture, and Implementation", 2002, University of Leipzig, Germany, 351 pages.

Peltz, "Web Service Orchestration", HP, Jan. 2003, Hewlett Packard, Co., 20 pages.

Ort, et al. "Java Architecture for XML Binding (JAXB)", Mar. 2003, Java-Sun, 14 pages.

Wikipedia, Java Architecture for XML Binding (JAXB), Oct. 2007, 3 pages.

Sun Microsystems, 'Java Message Service Version 1.0.2b, Aug. 27, 2001, 118 pages.

XA Resource (Java 2 Platform EE v1.4), "Interface XAResource", Dec. 12, 2002, 9 pages.

FOLDOC, "Definition of JMS", "http://foldoc.prg/?JMS", Jun. 6, 2001, 1 page.

Newcomer, Eric, "Understanding Web Services: XML, WSDL, SOAP, and UDDI", May 2002, 100 pages.

* cited by examiner

SYSTEMS AND METHODS FOR INTEGRATION ADAPTER SECURITY

CLAIM OF PRIORITY

This application claims priority to U.S. Provisional patent application No. 60/347,919, filed Oct. 18, 2001, entitled "APPLICATION VIEW," as well as U.S. application Ser. No. 60/347,901, filed Oct. 18, 2001, entitled "EVENT ADAPTER," each of which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 10/271,194 entitled "APPLICATION VIEW COMPONENT FOR SYSTEM INTEGRATIONS," by Mitch Upton, filed Oct. 15, 2002.

U.S. patent application Ser. No. 10/271,162 entitled "SYSTEM AND METHOD FOR PROVIDING A JAVA INTERFACE TO AN APPLICATION VIEW COMPONENT," by Mitch Upton, filed Oct. 15, 2002.

U.S. patent application Ser. No. 10/271,244 entitled "SYSTEM AND METHOD FOR INVOKING BUSINESS FUNCTIONALITY FOR A WORKFLOW," by Mitch Upton, filed Oct. 15, 2002.

U.S. patent application Ser. No. 10/271,414 entitled "SYSTEM AND METHOD FOR USING WEB SERVICES WITH AN ENTERPRISE SYSTEM," by Mitch Upton, filed Oct. 15, 2002.

U.S. patent application Ser. No. 10/271,157 entitled "SYSTEM AND METHOD FOR IMPLEMENTING AN EVENT ADAPTER," by Mitch Upton, filed Oct. 15, 2002.

U.S. patent application Ser. No. 10/271,156 entitled "SYSTEM AND METHOD USING A CONNECTOR ARCHITECTURE FOR APPLICATION INTEGRATION," by Mitch Upton, filed Oct. 15, 2002.

U.S. patent application Ser. No. 10/271,047 entitled "SYSTEM AND METHOD FOR IMPLEMENTING A SCHEMA OBJECT MODEL IN APPLICATION INTEGRATION," by Mitch Upton, filed Oct. 15, 2002.

U.S. patent application Ser. No. 10/271,402 entitled "SYSTEM AND METHOD UTILIZING AN INTERFACE COMPONENT TO QUERY A DOCUMENT," by Mitch Upton, filed Oct. 15, 2002.

U.S. patent application Ser. No. 10/271,423 entitled "SYSTEM AND METHOD USING ASYNCHRONOUS MESSAGING FOR APPLICATION INTEGRATION," by Mitch Upton, filed Oct. 15, 2002.

U.S. patent application Ser. No. 10/271,410 entitled "SYSTEM AND METHOD FOR IMPLEMENTING A SERVICE ADAPTER," by Mitch Upton, filed Oct. 15, 2002.

FIELD OF THE INVENTION

The invention relates generally to the providing security in a network environment.

BACKGROUND

E-commerce has become a major driving factor in the new economy. To be successful in the long-term, e-commerce will require many companies to engage in cross-enterprise collaborations. To achieve cross-enterprise integration, a company must first integrate its internal applications. Using existing technology and tools, application integration can be an expensive proposition. No integration solution exists that is easy to use, affordable, and based on industry standards. Neither does a solution exist that is based on an industry standard infrastructure, has universal connectivity, is capable of massive scalability, and has accessible business process tools.

Application integration to this point has been very inward-focused. Many existing integration systems have not focused on integrating applications between enterprises. Even when integration solutions were used for cross-enterprise integration, the solutions were still narrowly focused and aimed at vertical markets. This inward focus did little to help companies field external business-to-consumer and business-to-business applications, such as applications that can utilize the Internet to generate revenue and reduce costs. The requirement for Internet-enabled applications led to the rise of the application server market. To date, application servers have primarily been used to host external applications targeted at customers and partners. Application servers are themselves packaged applications that, instead of solving a specific problem, are general-purpose platforms that host vertical solutions.

The first attempts at application integration were primarily focused on low-level implementation details such as the format of the data, the byte ordering between machines, and character encoding. The focus on low-level data formats was necessary because, for the first generation of application integration solutions, there were no widely adopted standards for data encoding that could be deployed across multiple vertical applications.

The traditional approach involved connecting individual systems to, in effect, hardwire the systems together. This approach can be complex, as connecting different systems can require an intimate, low-level knowledge of the proprietary technologies of multiple systems.

Present integration systems, which have moved away from "hardwiring" systems together, still suffer from a lack of standards. Each integration vendor typically provides a proprietary solution for application integration, message transformation, message formats, message transport, and routing. Not one of these systems to date has achieved significant market share to enable its technologies to become the de-facto standard. This lack of standards has given packaged application vendors little incentive to integrate these systems with their applications. Further, each of these integration systems or servers has its own proprietary API, such that packaged application vendors cannot leverage development beyond a single integration server. This fragmentation of the integration market has provided little financial incentive for third parties.

BRIEF SUMMARY

Systems and methods in accordance with the present invention can restrict access to a resource such as an enterprise system. An application view component can receive a request from a validated system user, and can configure a security principal for that. The application view component can provide an interface that the user can use to access the resource, providing that user has permission to access the resource. A resource adapter can receive a request or call from the application view, and can use a security principal map to map the security principal to a resource-appropriate principal. The resource adapter can perform a resource sign-on in a manner specific to the resource using the resource-appropriate principal.

Other features, aspects, and objects of the invention can be obtained from a review of the specification, the figures, and the claims.

DETAILED DESCRIPTION

Figure 1:
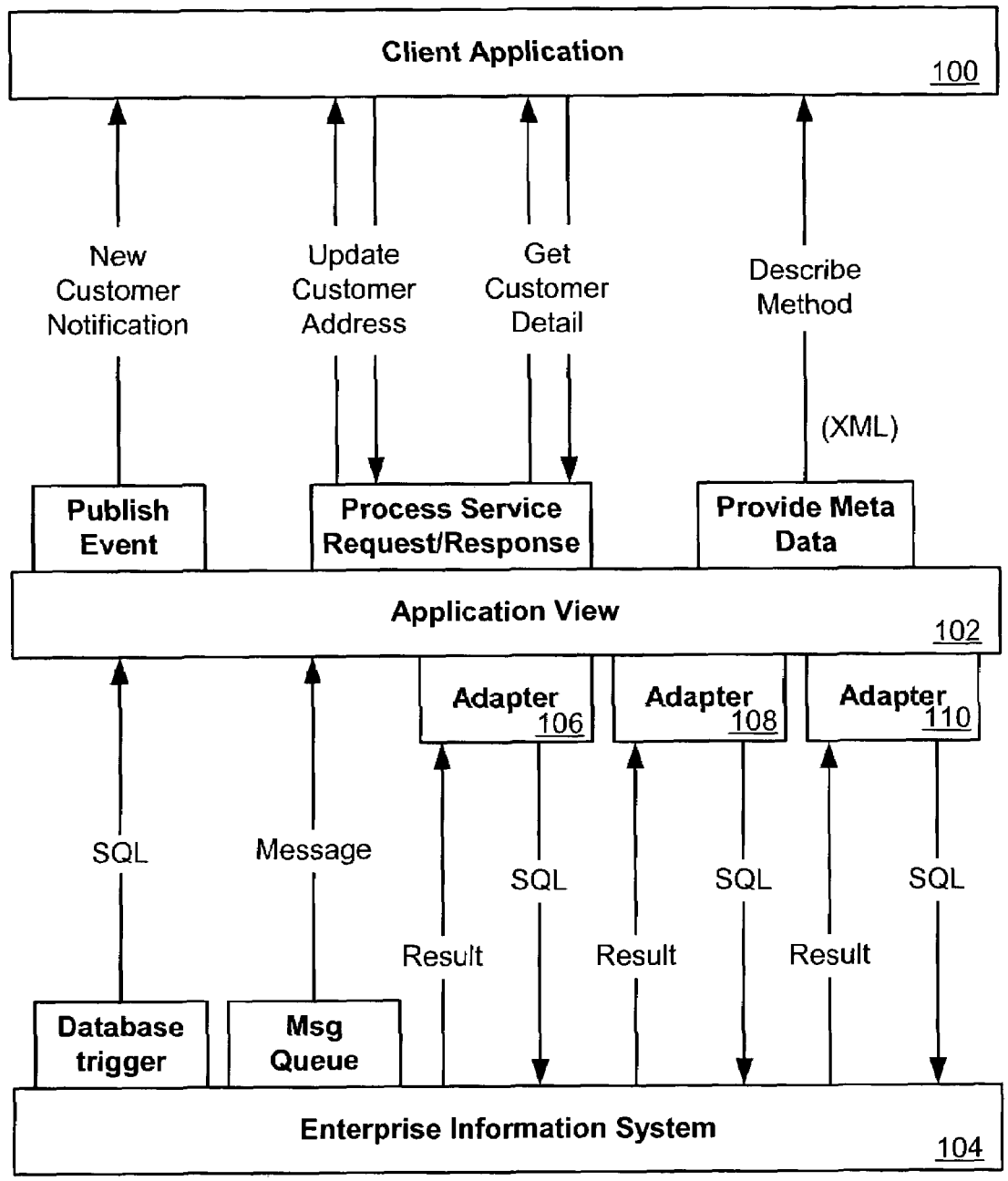
FIG. 1 is a diagram of an integration system utilizing an application view component that can be used in accordance with one embodiment of the present invention.

Application integration components can be used to integrate a variety of applications and systems, such as Enterprise Information Systems (EISs). Information technology (IT) organizations typically utilize several highly-specialized applications. Without a common integration platform to facilitate application-level integration, these applications cannot be integrated without extensive, highly-specialized development efforts.

Application integration can utilize adapters to establish an enterprise-wide, united framework for integrating any current or future application. Adapters can simplify integration efforts by allowing each application to be integrated with an application server, instead of requiring that each application being integrated with every other application.

The development and widespread acceptance of standards such as the Java 2 Platform, Enterprise Edition (J2EE) from Sun Microsystems, Inc. of Santa Clara, Calif., as well as the eXtensible Markup Language (XML), has laid the groundwork for a standardized approach to the development of these adapters. Perhaps the most significant of these standards for application integration is the J2EE Connector architecture. The J2EE Connector architecture provides a standardized approach for the development of adapters for all types of applications, from legacy mainframe applications, such as CICS from IBM, to packaged applications such as PeopleSoft, Siebel, and SAP. The adoption of such standards enables businesses to develop adapters that work on any J2EE-compliant application server, for example.

Application integration can build on this standardized approach in an application integration framework by providing a standards-based architecture for hosting J2EE Connector architecture-based adapters. Developers can build J2EE Connector architecture-compliant adapters and deploy these adapters, in the integration framework, to connect enterprise applications to an application server.

Adapters

In order to integrate the operations of an enterprise, the data and functions of the various enterprise systems in an organization must be exposed. In the J2EE model, EIS functionality is exposed to Java clients using an adapter, also referred to as a resource adapter or connector, according to the J2EE Connector Architecture. Adapters can be constructed that define services and events. A service represents a message that requests a specific action in the EIS. For example, an adapter might define a service named AddCustomer that accepts a message defining a customer and then invokes the EIS to create the appropriate customer record. An event issues messages when events of interest occur in the EIS. For example, an adapter might define an event that sends messages to interested parties whenever any customer record is updated in the EIS.

These adapters can be used to define business-focused interfaces to an EIS, the interfaces referred to herein as "application views" of the respective adapters. An application view can provide a simple, self-describing, consistent interface to services and events in an application. Application views can make use of an adapter for an EIS, making it possible to expose existing information systems as business services. Unlike adapters, however, an application view does not require users to have intimate knowledge of the EIS or the client interface for that EIS, such that non-programmers or technical analysts can use application views. An application view can provide a business-oriented way for business analysts to access enterprise data without worrying about the programmatic details defined in an adapter. These same users may be otherwise unable to use an adapter directly, due to a lack of familiarity with the EIS.

An application integration component directed at enterprise application integration can have several primary aspects. If the functionality of an EIS such as a PeopleSoft system or an SAP system is to be invoked, an implementation of the J2EE Connector Architecture can be used. If something occurs inside an EIS system, such as a trigger going off, an event can be generated. This event may, in some embodiments, need to be communicated to an external application. An event architecture in an application integration component can handle this communication.

Application Views

An application view can provide significant value to an application integration component. An application view can abstract away much of the complexity in dealing with an application, such as a backend EIS system. Application views can also simplify the way in which adapters are accessed. Application views can provide a layer of abstraction, for example, between an adapter and the EIS functions exposed by that adapter. Instead of accessing an EIS by direct programming a user can simply: edit an adapter's application views, create new application views, or delete any obsolete application view(s). A layer of abstraction formed by application views can help non-programmers maintain the services and events exposed by an adapter. Each application view can be specific to a single adapter, and can define a set of business functions on that adapter's EIS. After an adapter is created, a Web-based interface for the adapter can be used to define application views.

If an application view is used as a primary user interface for an adapter, a number of features can be included that are not commonly found in existing enterprise application integration technologies. Application views can, for example, use XML as a common language among applications. Service and event definitions can be used to expose application capabilities. XML schemas can be used to define the data for services and events. Bidirectional communication can also be supported in adapters.

An application view can be an integral part of an integration framework. An application view can provide a view of the application capabilities exposed by an adapter that a user can customize to meet specific needs. A user can tailor an application view, for example, for a specific business purpose. As a result, the application view can provide an effective alternative to the "one size fits all" approach that many applications provide for the design of a client interface. An application view can be defined for only the business or other capabilities that are applicable for a specific purpose. The capabilities can be customized such as by naming, describing, and defining the data requirements.

In one example of a system using a resource adapter and application view component, shown in FIG. 1, adapters 106, 108, 110 can be developed that allow a client application 100 to communicate with an Enterprise Information System 104 through the use of an application view 102. A developer can begin by coding an adapter that exposes the functionality in the enterprise application that accesses enterprise data. The functionality the adapter exposes could, for example, update records in a database using SQL statements, or could request information from an SAP system using its BAPI or IDOC interfaces. A business analyst, working with the developer, can then define an application view of the adapter using an application view interface.

In addition to defining and implementing adapters, an application integration component can enable a developer to create application views. An application view can provide a layer of abstraction on top of an adapter. Whereas adapters are typically closely associated with specific functionality in the EIS, an application view can be associated with business processes that must be accomplished by clients. An application view can convert the steps in the business process into operations on the adapter.

An application view can expose services and events that serve the business process. An application view control can be associated with a particular application view, and can make the services and methods of the application view available to web services as control methods and callbacks. A variable name used to access a new application view control instance from a web service should be a valid Java identifier.

Integration Framework

Application integration can utilize an integration framework, which can provide a systematic, standards-based architecture for hosting application views. Features of such a framework can include application views for exposing application functions and design-time graphical user interfaces (GUIs), such as web-based interfaces that can be used for creating application views. The integration framework utilizes adapters, instead of "hardwiring" enterprise systems together. Once an adapter is deployed for an EIS, other components and applications can use that adapter to access data on the EIS.

A framework in accordance with one embodiment of the present invention relies on XML as the standard format for messages. XML includes XSLT, a standard for transforming XML documents into other XML documents. XSLT is designed for use as part of XSL, which is a stylesheet language for XML. In XSLT, an XML document is used to specify the operations to perform on a class of XML documents in order to transform the documents' structure and content. An XSLT transformation can make use of any of the operations built into the Java programming language, or can make use of custom operations written either in Java or in native code. An integration framework allows a business process to invoke an XSLT engine in order to transform XML messages.

An integration framework can also rely on standards for transporting messages such as Java Message Service (JMS) and HTTPS. JMS is a standard API for interfacing with message transport systems. Using JMS, a framework can utilize any message transport mechanism that provides a JMS interface. The J2EE Connector architecture standard does not specify a message transport mechanism, but an application integration framework can specify such a transport mechanism.

An integration framework can be based on an existing standard infrastructure, such as an application server that supports J2EE, JMS, and the J2EE Connector architecture. Using such a standard infrastructure also provides for high availability and scalability, such as by clustering and resource pooling. The framework can provide for universal connectivity by enabling the construction of XML-based application adapters that can connect to any legacy and packaged application. An adapter development kit can be used to allow users such as customers, system integrators, and packaged application vendors to quickly develop J2EE connector architecture-compliant and integration framework-based adapters. The framework can utilize XML, which means that the same data format can be used for both within- and between-enterprise integration, since many e-commerce systems use XML as the standard message format.

An integration framework can also utilize a business-process engine to allow non-programmers to graphically construct and maintain business processes. An integration framework can implement a common model on top of the J2EE Connector architecture that is focused on business-level concepts. This model, which can consist of XML-encoded events and services, allows the management of a consistent integration environment, regardless of the interface required between adapters and their target applications. The business processes can react to events generated by applications, and they can invoke an application's functionality via services that are exposed by an application adapter.

Security

Because an application view provides access to the inner workings of an application, it will often be desirable to limit access through the application view. If more than one level of access is desired, this can require the setting and management of multiple levels of access and security. One embodiment in accordance with the present invention allows methods to be invoked on an application view that allow a security level be set before services are invoked on the application view.

Figure 2:
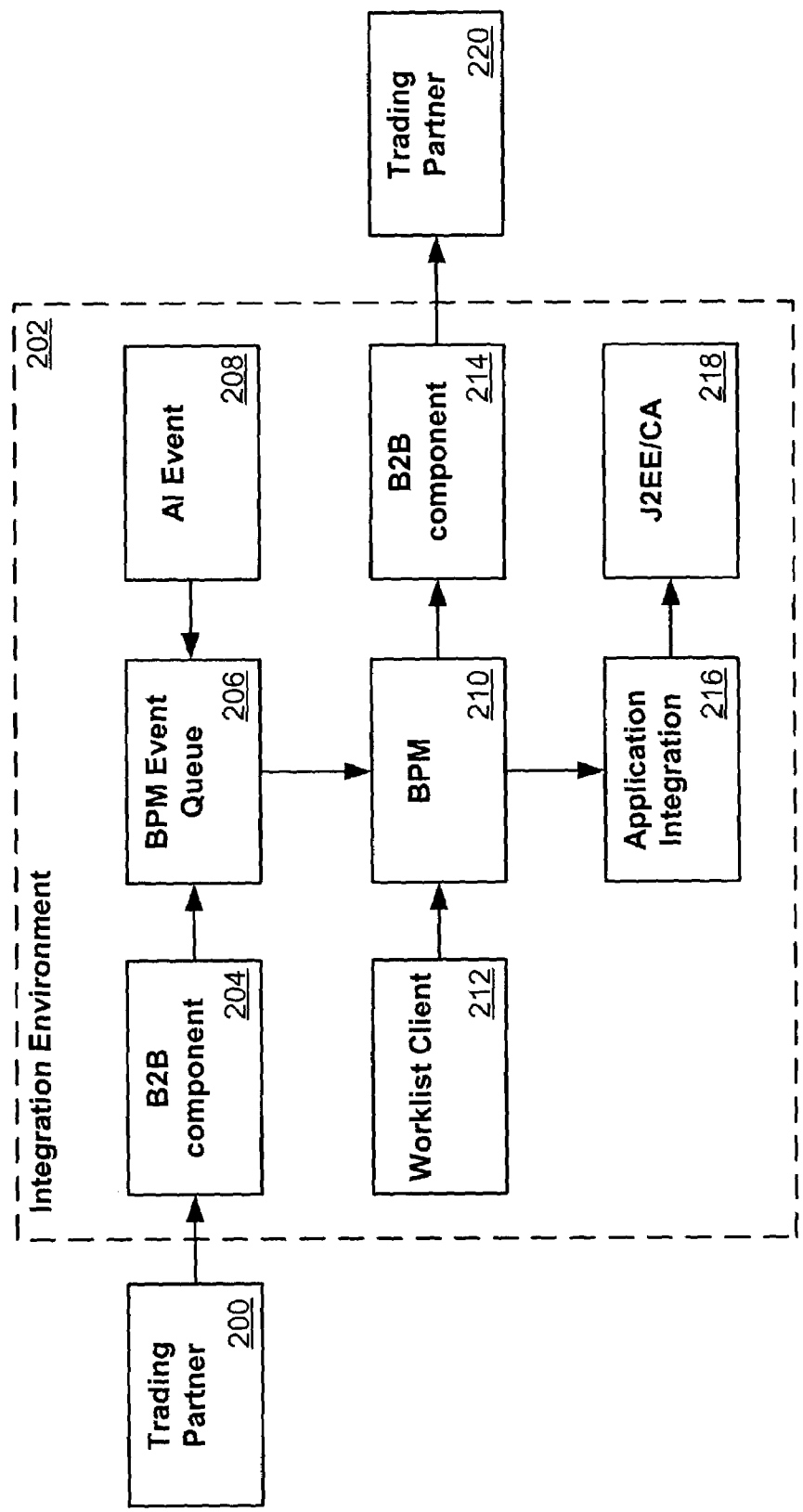
FIG. 2 is a diagram of another system utilizing an application view component that can be used in accordance with one embodiment of the present invention.

For example, FIG. 2 shows an business process integration system that allows two trading partners 200, 220 to communicate with each other through an integration environment 202. Trading partner 200 can make a request into, and/or log in to, a server or integration component capable of validating a user, such as a business-to-business (B2B) component 204 of the integration system. Once the trading partner is validated through the B2B component 204, the trading partner can become a valid system user. The trading partner request can then go into an event queue, such as a business process management (BPM) event queue 206. The event queue can also receive an event from internal components, such as an application integration event 208. When the business process management component 210 is ready to receive an event from the event queue 206, the events can be dequeued into the BPM component. When a workflow is started through such an event, the workflow can run as a system user. If, however, a workflow is started through a manual task start from a worklist client 212, the workflow can run as the security principal associated with the worklist client 212. A workflow can be started by a worklist client through an API call, for example. A principal is a user or programmatic entity with the ability to use the resources of a system.

If the BPM component needs to access an enterprise system or other underlying resource through a JCA connector 218, the BPM component 210 can make a call to an application integration component 216, where the principal can be configured by an application view for the application integration component 216. An application integration service can run as the security principal configured for the application view. The JCA component can use a security principal map. When a JCA adapter receives a request, for example, the adapter can map the caller's security principal to one that is appropriate for the EIS system. Once the BPM component 210 has all the necessary information to serve the request, the BPM component can pass the response or message on to another B2B component 214 in communication with the trading partner 220 to receive the response.

Methods such as "setConnectionSpec( )" and "getConnectionSpec( )," for example, can be used to set the credentials for an EIS using a "ConnectionSpec" object. Credentials can refer to information describing the security attributes (identity and/or privileges) of a user or other principal. Credentials can be claimed through authentication or delegation, and used by access control. To instantiate a ConnectionSpec object, a class such as "ConnectionRequestInfoMap" can be provided. Such a class can be provided through, for example, an adapter development kit (ADK). A user can also implement a unique class created by that user. If a user creates such a unique class, the user may need to include certain interfaces. These interfaces can include, for example: a ConnectionSpec interface or ConnectionRequestInfo interface for a JCA class, a Map interface for an SDK class, and a Serializable interface for an SDK class.

Before using methods such as setConnectionSpec( ) or getConnectionSpec( ), a ConnectionSpec object should be instantiated. A class such as a ConnectionRequestInfoMap class can be used to instantiate a ConnectionSpec object. To implement a ConnectionSpec object, the user can use a preexisting class such as ConnectionRequestInfoMap class or implement a user-specific class. If implementing a user-specific ConnectionSpec class, certain interfaces should be included. These interfaces can include, for example, ConnectionSpec (JCA class), ConnectionRequestInfo (JCA class), Map (SDK class), and Serializable (SDK class).

After implementing a ConnectionSpec class and instantiating a ConnectionSpec object, the user can take advantage of both with the application view methods such as setConnectionSpec( ) and getConnectionSpec( ). Code for a method such as setConnectionSpec( ) can be given by, for example:

```
/**
* Sets the connectionSpec for connections made to the EIS. After
the
* ConnectionSpec is set it will be used to make connections to the
* EIS when invoking a service. To clear the connection spec, and use
* the default connection parameters, call this method using null.
*
* @params connectionCriteria connection criteria for the EIS.
*/
public void setConnectionSpec(ConnectionSpec connectionCriteria)
{
m__connCriteria = connectionCriteria;
}
```

Similarly, code for a method such as getConnectionSpec( ) can be given by, for example:

```
/**
* Returns the ConnectionSpec set by setConnectionSpec. If no
* ConnectionSpec has been set null is returned.
*
* @returns ConnectionSpec
*/
public ConnectionSpec getConnectionSpec()
{
return m__connCriteria;
}
```

To set a ConnectionSpec class, it can be passed a properly-initialized ConnectionSpec object. To clear a ConnectionSpec class, it can be passed a ConnectionSpec object with a null value. An example of how to use a ConnectionSpec object can be given by:

```
Properties props = new Properties();
ApplicationView applicatgionView = new
ApplicationView(getInitialContext(props),"appViewTestSend");
ConnectionRequestInfoMap map = new ConnectionRequestInfoMap();
// map properties here
map.put("PropertyOne","valueOne");
map.put("PropertyTwo","valueTwo");
//set new connection spec
applicationView.setConnectionSpec(map);
IDocumentDefinition requestDocumentDef =
applicationView.getRequestDocumentDefinition("serviceName");
SOMSchema requestSchema =
requestDocumentDef.getDocumentSchema();
DefaultDocumentOptions options = new DefaultDocumentOptions();
options.setForceMinOccurs(1);
options.setRootName("ROOTNAME");
options.setTargetDocument(DocumentFactory.createDocument());
IDocument requestDocument =
requestSchema.createDefaultDocument(options);
requestDocument.setStringInForst("//ROOT/ElementOne","value");
requestDocument.setStringFirst("//ROOT/ElementTwo","value");
.
.
.
// the service invocation will use the connection spec set to connect
to the EIS
IDocument result = applicationView.invokeService("serviceName",
requestDocument);
System.out.println(result.toXML());
```

Container-Managed and Application-Managed Sign-on

As specified in the J2EE Connector Specification, Version 1.0 Final Release, a J2EE Connector Architecture implementation can support both container-managed and application-managed sign-on. At runtime, a J2EE Connector Architecture implementation can determine the chosen sign-on mechanism. Such determination can be based upon the specified information in the invoking client component's deployment descriptor. If the implementation is unable to determine the sign-on mechanism being requested by the client component, such as may be due to an improper JNDI lookup of the resource adapter Connection Factory, the Connector Architecture can attempt container-managed sign-on. Even in this case, if the client component has specified explicit security information, this information can also be presented on the call to obtain the connection.

Application-Managed Sign-on

With application-managed sign-on, a client component can provide the necessary security information (typically a username and password) when making the call to obtain a connection to an Enterprise Information System (EIS). In this scenario, the application server may otherwise provide no additional security processing other than to pass this information along on the request for the connection. The provided resource adapter would use the client component provided security information to perform the EIS sign-on in a resource adapter-implementation specific manner.

Container-Managed Sign-on

With container-managed sign-on, a client component does not present any security information, and the container can determine the necessary sign-on information and provide this information to the resource adapter when making a call to request a connection. In all container-managed sign-on scenarios, the container can determine an appropriate Resource Principal and provide this Resource Principal information to the resource adapter in the form of a Java Authentication and Authorization Service (JAAS) Subject.

Password Credential Mapping Mechanism

The J2EE Connector Specification, Version 1.0 Final Release defines two types of credentials that resource adapters can support: password credentials and generic credentials. A user can specify password credentials in a security-principal-map element in a ra.xml deployment descriptor file. The security-principal-map element was provided to map between the initiating principal and resource principal. A Password Converter Tool can be used for encrypting the password stored in the security-principal-map element. The storage of user names and passwords for principal maps in the ra.xml file is not the most elegant nor secure storage mechanism, however.

The J2EE Connector specification, Version 1.0 Final Release requires storage of credentials in a javax.security.auth.Subject; the credentials are passed to either the createManagedConnection( ) or matchManagedConnection( ) methods of the ManagedConnectionFactory object. To comply with this, a J2EE Connector Architecture implementation can build the Subject and store the credentials by performing steps such as the following. First, a security.Service.EISResource object can be instantiated as follows:

EISResource(java.lang.String applicationName, java.lang.String moduleName, java.lang.String eisName)

The Initiating Principal for the connection request can be obtained. The Credentials for that Initiating Principal can also be obtained as follows:

security.Service.PrincipalAuthenticator(String initiatingPrincipal, weblogic.security.Service.Resource eisResource)

A javax.security.auth.Subject can be instantiated, and the Credentials can be added to the private set in the Subject as follows:

Subject.getPrivateCredentials( ).add(Credential)

Authentication Mechanisms

Application/integration server users typically must be authenticated whenever they request access to a protected server resource. For this reason, each user can be required to provide a credential, such as a username/password pair or a digital certificate. Authentication mechanisms can include the following:

Password authentication—a user ID and password are requested from the user and sent to the server, possibly as clear text. The server can checks the information and, if it is trustworthy, grant access to the protected resource. The SSL (or HTTPS) protocol—can be used to provide an additional level of security to password authentication. Because the SSL protocol can encrypt data transferred between a client and an application/integration server, the user ID and password of the user do not flow in the clear. Therefore, the server can authenticate the user without compromising the confidentiality of the user's ID and password.

Certificate authentication—when an SSL or HTTPS client request is initiated, an application/integration server can respond by presenting its digital certificate to the client. The client can then verify the digital certificate and an SSL connection can be established. An authenticator class, such as CertAuthenticator, can extract data from the client's digital certificate to determine which server user owns the certificate and then retrieves the authenticated user from the server security realm.

Mutual authentication can also be used. In this case, the application/integration server not only authenticates itself, it also requires authentication from the requesting client. Clients can be required to submit digital certificates issued by a trusted certificate authority. Mutual authentication is useful when access is to be restricted only to trusted clients. For example, it might be desirable to restrict access by accepting only clients with digital certificates provided by the entity owning the server.

Users

Users are entities that can be authenticated in a server security realm. A User can be a person or a software entity, such as a Java client. Each User can be given a unique identity within a server security realm. A system administrator can guarantee that no two Users in the same security realm are identical.

Defining Users in a security realm can involve specifying a unique name and password for each User that will access resources in the server security realm. Special users can be provided for use by resource adapters. These special users can include, for example:

ra_initial—If a mapping is defined for this user, the specified credentials can be used for the initial connections created when starting the connection pool for this resource adapter. An InitialCapacity parameter on the pool can specify the number of initial connections. If a mapping is not defined for this user, a default mapping ra_default can be used. Otherwise, no credentials may be provided for the initial connections.

ra_anonymous—If a mapping is defined for this user, the specified credentials can be used when no user is authenticated for the connection request on the resource adapter.

ra_default—If a mapping is defined for this user, the specified credentials can be used when no other mapping applies for the current user or when no anonymous mapping is provided in the case where there is no authenticated user.

Groups

A Group can represent a set of Users who usually have something in common, such as working in the same department in a company. Groups can be a means of managing a number of Users in an efficient manner. When a Group is granted a permission in an ACL, all members of the Group can effectively receive that permission. Permissions can be assigned to Groups rather than to individual Users.

Deprecated Security Principal Map Mechanism

The "EIS Sign-on" section of the J2EE Connector Specification, Version 1.0 Final Release identifies a number of possible options for defining a Resource Principal on whose behalf the sign-on is being performed. Previous implementations implemented the Security Principal Map option identified in the specification. Under this option, a resource principal is determined by mapping from the identity of the initiating/caller principal for the invoking component. The resultant resource principal does not inherit the identity or security attributes of the principal that it is mapped from, but instead gets its identity and security attributes (password) based upon the defined mapping.

In order to enable and use container-managed sign-on, it can be necessary to provide a mechanism to specify the initiating-principal to resource-principal association. This can be done through a Security Principal Map that can be defined for each deployed resource adapter.

If container-managed sign-on is requested by the client component and no Security Principal Map is configured for the deployed resource adapter, an attempt can be made to obtain the connection, but the provided JAAS Subject can be NULL. Support for this scenario can be based upon the resource adapter implementation.

A scenario in which omitting configuration of a Security Principal Map might be considered valid is the case in which a resource adapter internally obtains all of its EIS connections with a hard-coded and pre-configured set of security information, and therefore does not depend on the security information passed to it on requests for new connections. This can be considered a third scenario, outside of application-managed sign-on and container-managed sign-on.

While the defined connection management system contracts can define how security information is exchanged between an application server and the provided resource adapter, the determination of whether to use container-managed sign-on or application-managed sign-on can be based on deployment information defined for the client application that is requesting a connection.

Using Container-Managed Sign-On

To use container-managed sign-on, an application server can identify a resource principal and request the connection on behalf of the resource principal. In order to make this identification, the server can look for a Security Principal Mapping specified with the security-principal-map element in a ra.xml deployment descriptor file.

A security-principal-map element can define the relationship of initiating-principal to a resource-principal. Each security-principal-map element can provide a mechanism to define appropriate resource principal values for resource adapter and EIS sign-on processing. The security-principal-map elements can allow the specification of a defined set of initiating principals and the corresponding resource principal's username and password to be used when allocating managed connections and connection handles.

Default Resource Principal

A default resource principal can be defined for the connection factory in a security-principal-map element. If an initiating-principal value of '*' is specified and a corresponding resource-principal value, the defined resource-principal can be utilized whenever the current identity is not matched elsewhere in the map. This element can be specified it in some form if container-managed sign-on is supported by the resource adapter and used by any client. In addition, the deployment-time population of a Connection Pool with Managed Connections can be attempted using the defined 'default' resource principal if one is specified.

Security Policy Processing

The J2EE Connector Specification, Version 1.0 Final Release defines default security policies for any resource adapters running in an application server. It also defines a way for a resource adapter to provide its own specific security policies overriding the default.

In compliance with this specification, can application server can dynamically modify the runtime environment for resource adapters. If the resource adapter has not defined specific security policies, the server can override the runtime environment for the resource adapter with the default security policies specified in the J2EE Connector Architecture Specification. If the resource adapter has defined specific security policies, the server can first override the runtime environment for the resource adapter first with a combination of the default security policies for resource adapters and the specific policies defined for the resource adapter. Resource adapters can define specific security policies using the security-permission-spec element in the ra.xml deployment descriptor file.

Security Architecture

A security architecture can be used to provide for server security and entitlement processing that allows security and business logic plugins to be inserted into a security service hosted by a server. The architecture can also be used to control access to one or more secured resources on that server, on another server within the security domain or realm, or between security realms. The security service can act as a focal point for security enforcement and access rights determination, and information used within one login process can flow automatically to other login processes, allowing for single sign or security enforcement.

A security architecture can allow for the determination of entitlements as used within an access context. A user can attempt to access a protected resource on the server. This protected resource may, for example, be a software application running on the server, a particular Web page or portion of a Web site, or a database system. Other types of protected resources may be used while remaining within the spirit and scope of the invention. When a user attempts to access the resource, the security service can determine the type of access request, the destination (the protected resource), and the context in which the request is made. From this information the security service can determine an entitlement, or a set of entitlements, for the user. Entitlements can denote that which a particular user can accomplish with a particular resource in a particular context. Entitlements can be used to represent the business logic or functionality required by the server provider, thus bridging the gap between a simple security platform, and a complex business policy platform.

A security architecture can also allow for the integration of third party vendor security products to provide protection for such application types as Enterprise Java Beans, Web Applications (Servlets, Java Server Pages (JSP's)), and Resources (Remote Method Invocation (RMI), Java Messaging System (JMS)). An architecture can also allow for the integration of external public key infrastructure to support such advanced features as certificate and key retrieval, certificate validation, and revocation mechanisms (Certificate Revolution List (CRL), Online Certificate Status Protocol (OCSP)).

For many systems, it may be desirable to include support for the Java 2 Enterprise Edition (J2EE) specification and interoperability therewith. These J2EE specification features include the Common Secure Interoperability (CSI) protocol, user identity tokens, the Stateless Authentication Service (SAS) protocol, support for propagation of security credentials across machine, cluster, and/or domain boundaries, control of propagation of identity based on policy, enhanced support for virtual host/sites, the ability to generate a user identity scoped to domain, and host/site specific security policies.

It may also be desirable to include support for features such as updated SSL capabilities, hardware accelerators, Transport Level Security (TLS) protocol, session resumption, certificate authorities, protection of network connections, Web server proxy, server to server communications, encryption of session ID, and enhanced integration with directory servers.

Dynamic Role Association

Dynamic Role Association is a mechanism that can be used to allow a late binding of the association of roles to principals. A role is an organizational identity that defines a set of allowable actions for an authorized user. Dynamic Role Association is capable of taking the context of the request into consideration during the determination of the roles for which the principal is entitled. Dynamic Role Association can be thought of as the late binding of principals to roles at runtime. This late binding can occur just prior to an authorization decision for a protected resource regardless of whether the principal-to-role association is statically defined or dynamically computed. Because of its placement in the invocation sequence, the result of any principal-to-role associations can be taken as identity as part of any authorization decision made as part of this request.

Unlike statically defined associations, the association of principals to roles can be computed dynamically at runtime. The computation of a dynamic role is able to access a number of pieces of information that make up the context of the request, including the identity of the target (if available), the values of the request's parameters, the values of profile attributes associated with the initiating principal, as well as potentially other information.

The context information can be utilized as values of parameters in an expression that is to be evaluated by a rules or expression evaluation engine. Depending upon the functionality provided by the evaluation engine, it may also be possible to express the ability to call out to an external class that performs external calculations, such as the amount of miles flown by the principal, that are then used as parameter of the expression.

In addition to computing any roles that should be dynamically associated with the principals in the Subject, this same functionality also can be responsible for associating any roles that were statically defined either through the consumption of a J2EE defined Deployment Descriptor or by an administrator.

The result of this capability can be, for example, an updated JAAS Subject that contains any roles that the principals contained in the Subject were entitled to receive given the context and the target. These roles can then be available to any authorization decisions on protected resources, as well as business container and application code. For example, a personalization server, application server, or Web server, could utilize standard methods to determine if a particular role is held by the subject as a means to personalize a web page. This same mechanism could be used by an Enterprise Java Bean or other application to determine whether to retrieve certain fields from a record in a database, without having knowledge of the business policies that determine whether access should be allowed, resulting in field-level authorization.

Parametric Authorization

Parametric Authorization is a mechanism that can allow an authorization decision to be determined about a protected resource, which can be based on the context of the request. Within such an architecture, the scope of enforcement can apply to all execution and resource containers. This can be accomplished by having all execution and resource containers obtain authorization and role mapping services through an AccessController object provided by a Security Service. An AccessController can utilize authorization services provided through Service Provider Interfaces in order to provide the requested capabilities.

Service Provider Interfaces (SPIs) can define the mechanisms used to provide Dynamic Role Association and Parametric Authorization. SPIs can be based on a delegated authorization design that results in the point of enforcement being moved to the provider of the functionality, instead of within the application server itself. A Service Provider Interface (SPI) can be a package or set of packages that support a concrete implementation of a subset of services.

In addition, methods defined on the Service Provider Interfaces that comprise the authorization framework can utilize an enforcement mechanism designed to support a capabilities-based authorization mechanism that more naturally aligns with the services provided by 3rd-party authorization vendors. The use of a capabilities-based mechanism can allow the delegated authorization approach to support both capabilities-based as well as permission-based implementations.

In a parametric authorization-based mechanism, the authorization decision can be made using the context of the request, allowing the authorization decision to more closely represent real business decisions. There may be little need for compensating security checks in the application itself. In a real-world banking example, it is possible for the authorization decision to take into consideration the amount of the transfer, the currency of both source and destination accounts, and the day of the week as part of processing the business policy that controls whether transfers are allowed, by whom, and under what circumstances.

Access to Context Information

Providing context information without prior knowledge of a business policy can be accomplished by using callbacks to containers from the authorization provider. While changing the type or number of parameters of a request can fundamentally change the application and require the application be re-deployed, it is possible for the implementations of dynamic role association and parametric authorization providers to obtain access to the context information without requiring the application to have prior knowledge of aspects of the business policies.

Service Provider Interfaces defined to work with the invention and support the authorization framework can utilize a standardized callback mechanism similar to the one defined in the Java Authentication and Authorization Service (JAAS). Utilizing a callback handler that is passed from the container to the implementation of the Service Provider Interfaces, the provider can request that specific context information be returned. When the container's callback handler is called, the container can respond by populating the callbacks with the appropriate values. If the container does not understand the callback specified in the handler, it does not update the callback with a value. Neither the application, nor the container may be aware of changes to business policy since they are queried for context information that is driven by the evaluation of specific business policy expressions.

Entitlement Engine

An entitlement processing engine (entitlement engine) can satisfy the requirements of parametric authorization by utilizing an implementation capable of specifying that the value of a parameter from the business request, primary key, attribute from a Principal contained in the JAAS Subject that represents an authenticated user, and any potentially other information considered part of the context be expressed as part of a rule expression.

An implementation can request parametric information from the caller on-demand, instead of requiring any parametric information that could be potentially used by the evaluation of rules to be passed at the beginning of rule evaluation. The mechanism for requesting information can be in the form of a callback similar to that defined for JAAS. The implementation might call back for each piece of information individually, request multiple pieces of information in a single callback, or a combination of both.

An implementation can also specify the name of a Java class that will be called as part of the evaluation of a rule. The value returned from the Java class will be used in the evaluation of the rule expression. This can be thought of as a macro facility where user provided code is called to compute a value that is then taken into consideration when evaluating the rule. For example in a travel booking example, a rule expression could specify a call to a user-supplied class that computes or looks up the number of miles a passenger represented by the Subject has flown to date.

The evaluating of a set of rules can result in a boolean value that indicates whether the rule was successfully satisfied or not.

A framework architecture can allow application implementations, particularly login, authorization, and auditing implementations, to be deployed or "plugged in" to allow the development of readily adaptable and customizable business functions and scenarios. These systems can serve to interpret the principal identity in the context of a particular scenario, and to tailor business functions to meet the interpreted identity.

A framework architecture can allow Java developers to make use of existing Java security features, as well as to greatly expand the use of these security features in a manner that is transparent to the developer (or the user). This can also allow the provided security to be distributed throughout the enterprise without a need for additional layering or translation of security processes.

Figure 3:
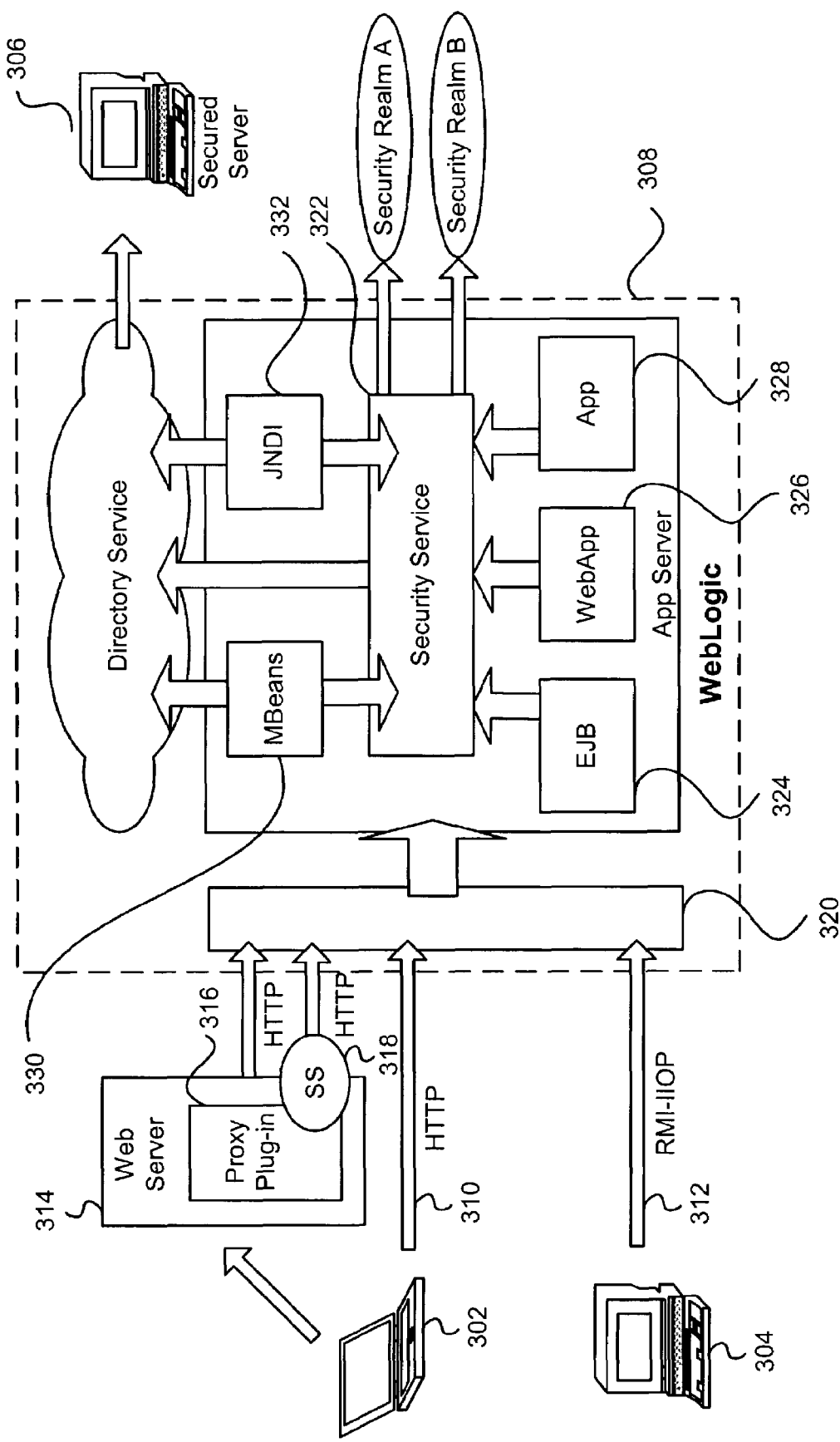
FIG. 3 is a diagram of a security architecture system that can be used with the systems of FIGS. 1 and 2.

FIG. 3 shows an example of a security architecture that can be used with systems and methods in accordance with embodiments of the invention. As shown therein, clients 302, 304 (which may be either physical hardware clients or software applications) may attempt to access a secured service or resource 306, such as a persistent directory server, via a transaction or application server 308. An example of such a transaction server is the Weblogic Server product from BEA Systems Inc., San Jose, Calif., although the invention may be used with any other server product or equivalent system. Internet CORBA clients will typically attempt to make such an access through an Internet Inter-ORB Protocol (IIOP) request 312. Web clients will typically attempt to make an access through a series of hypertext transfer protocol (http) requests 310, either directly via a Web server 314, or via a proxy plug-in 316 (in which case the proxy may also provide additional functionality, such as, for example, secure socket layer (SSL) encryption 318). In any case, the connection attempt is received by the transaction server, often via an initial connection filter 320, and is passed to the security service 322. In accordance with the invention, the security service 322 is the focal point for security determination, including client and user level resource access, authorization, certification, privilege assessment and entitlement determination. Enterprise Java Beans (EJB's) 324, Web applications (WebApp's) 326, and other forms of applications may all use the security service through the use of containers. The security service handles calls from these containers to the protected resource, which in the case of FIG. 2. The calls may be handled by, for example, a plurality of managed beans (MBeans) 330, or the Java Named Directory Interface (JNDI) 332.

Figure 4:
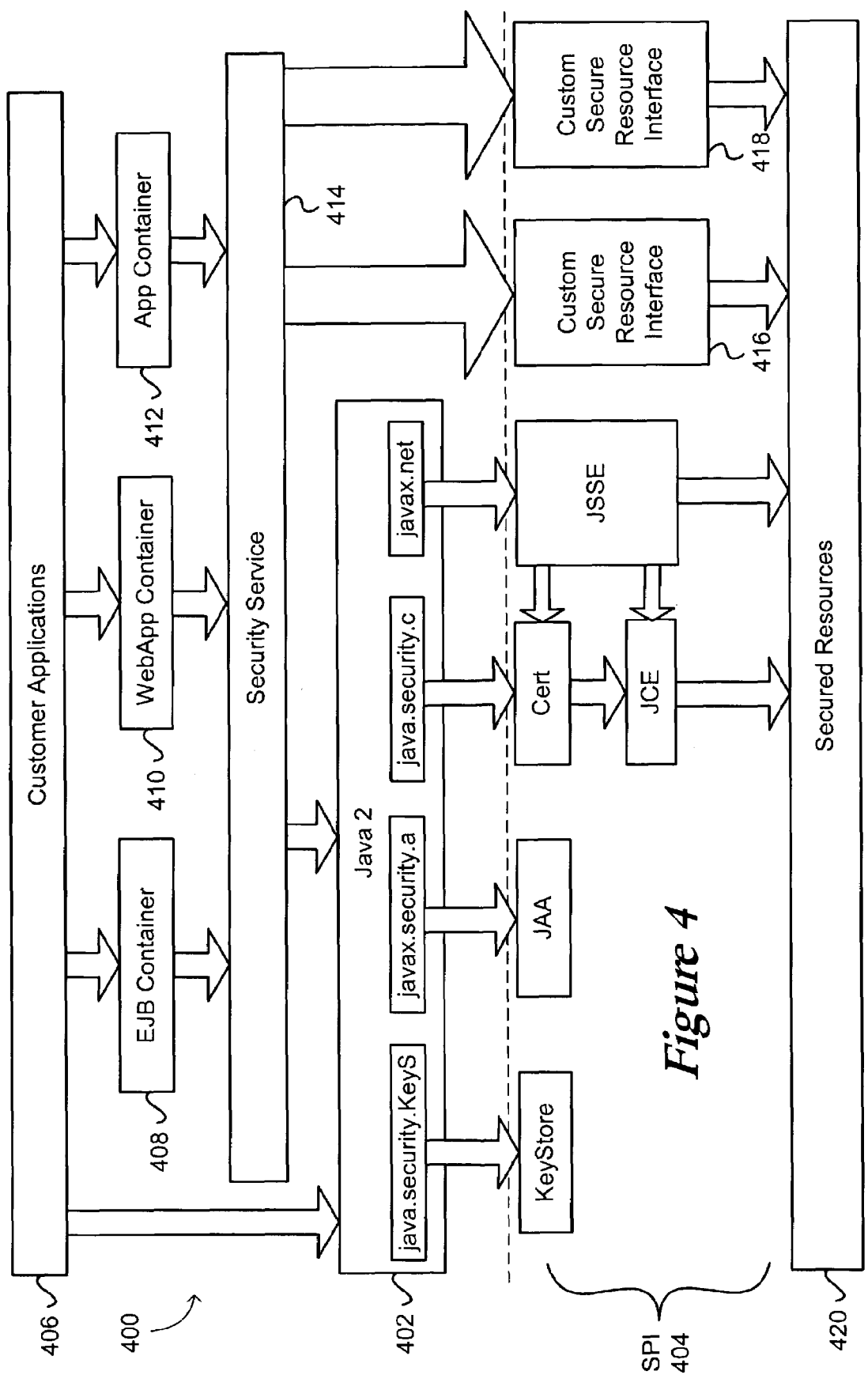
FIG. 4 is another diagram of a security architecture system that can be used with the systems of FIGS. 1 and 2.

FIG. 4 illustrates an embodiment of the security service architecture 400 in greater detail. The security service augments the basic security services and features provided by the standard Java2 Enterprise Edition security set. As shown in this example, the basic Java security set 402 includes security provider interfaces 404 for key storage, authentication, certificate validation, and secure sockets, among others. Customer applications 406 may be written to directly take advantage of the Java security layer and these SPI's. The invention, as shown in FIG. 3 greatly enhances the developer's options in making use of these and other security features. In accordance with the invention, customer applications are deployed in containers, for example, an EJB container 408 of a WebApp container 410. The containers communicate directly with the security service 414 (herein the same as security service 322), which in turn communicates with the Java security layer 402 and its security SPI's 404. This allows the responsibility for secure authorization decisions to be moved from the application and placed in the security service layer.

In addition, such a framework can integrate the use of preexisting Java security SPI's 404 with custom SPI's 416, 418. Additional SPI's such as, for example, a connection filter, an access decision interface, an audit channel, and a certificate authenticator, can be included or integrated with the security server. The security service mediates access to the entire range of secured enterprise resources.

Figure 5:
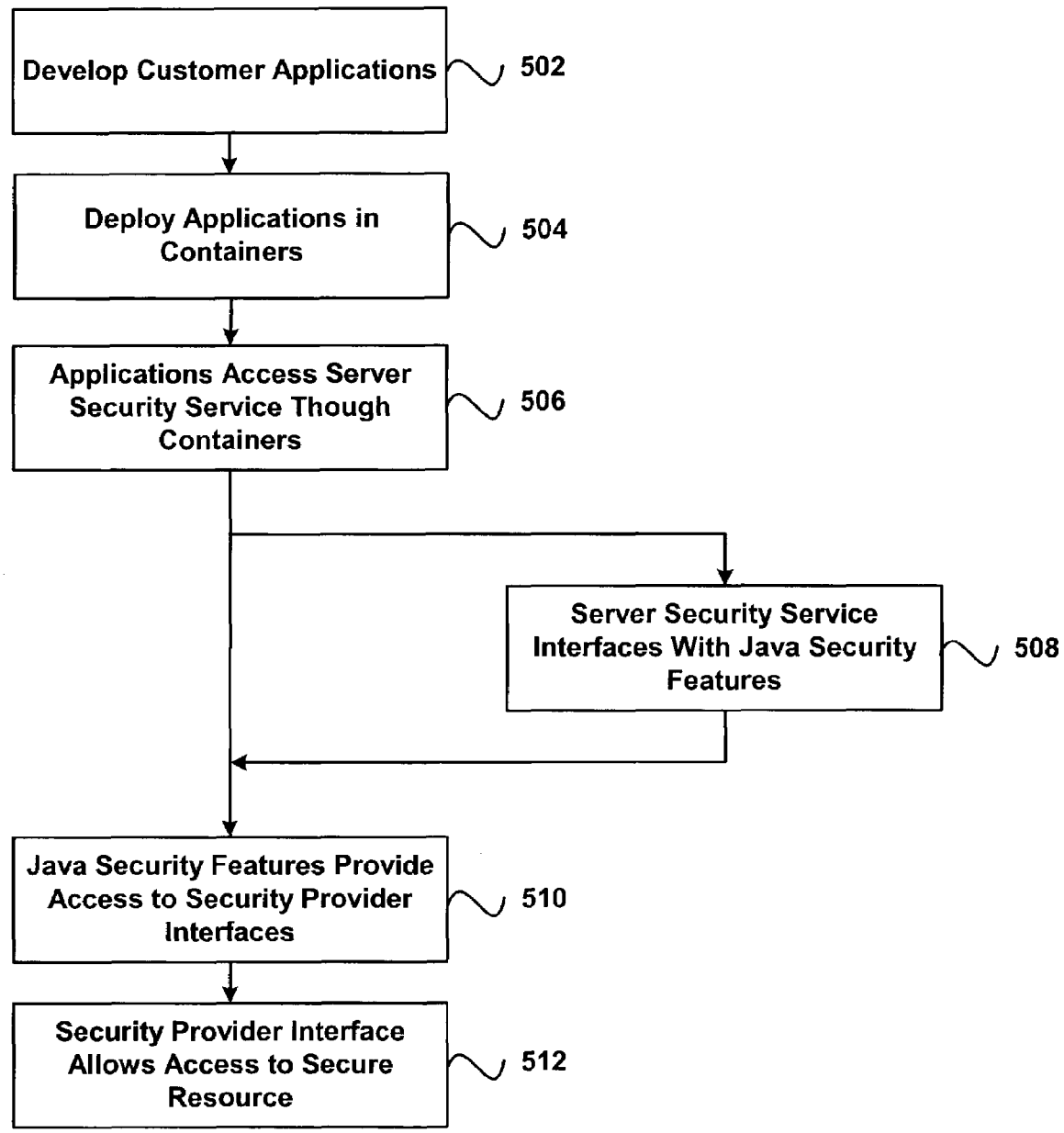
FIG. 5 is a flowchart showing a method for secured access that can be used with the systems of FIGS. 1 and 2.

FIG. 5 illustrates a process by which an application may use a framework to access a secure resource. In step 502, a developer creates a customer application. The application may be one used by a physical user or customer, or may be an application interface program to allow another application to make use of the security server. In step 504, the application is deployed within a container, the deployment process of which is disclosed in further detail below. The application then, in step 506, accesses the security service using this container. Optionally, in step 508, the security service can interface directly with a set of J2EE compliant Java security features. Alternatively, in step 510, the containers are used to allow access to a third-party or custom Security Provider Interface. In step 512, the Security Provider Interface allows the application to access the secure resource, provided that the security service has indicated that the access requested should be allowed.

Security Provider Interfaces

Security Provider Interfaces (SPI) that can be used with the invention include interfaces for:

Authentication—Java Authentication and Authorization Service (JAAS) LoginModule

Authorization—AccessDecision

Auditing—AuditChannel

Principal Mapping—>Role Mapping—JMS LoginModule

Principal—>Credentials Mapping—JAAS LoginModule

Key Storage—Java 2 KeyStoreSpi

Certificate Retrieval and Revocation—CertPath

Certificate Mapping—CertAuthenticator

Hardware Accelerators—Java Cryptographic Extensions

Perimeter Protection—ConnectionFilter

It should be evident to one skilled in the art that the SPI's described herein are merely examples of the type of interface that can be used with the invention, and are listed here for purposes of illustrating the flexibility of the security service architecture provided by the invention. Other types of interface can be used to replace or augment those described, while remaining within the spirit and scope of the invention.

Authentication SPI

A JAAS Login Module that can be used with the invention can be based on the standard JAAS LoginModule, but can additionally support standard Login Module implementations. The authentication SPI can be extended to support management of users, groups, and to provide support for multiple JAAS Login Modules. Credentials can be shared across Login Module instances, and a separate Login Module to update with user profile information can be provided. The responsibilities of the Authentication SPI include authentication of users based on security realm scope, and the population of the principal in the JAAS Subject.

Authorization SPI

Figure 6:
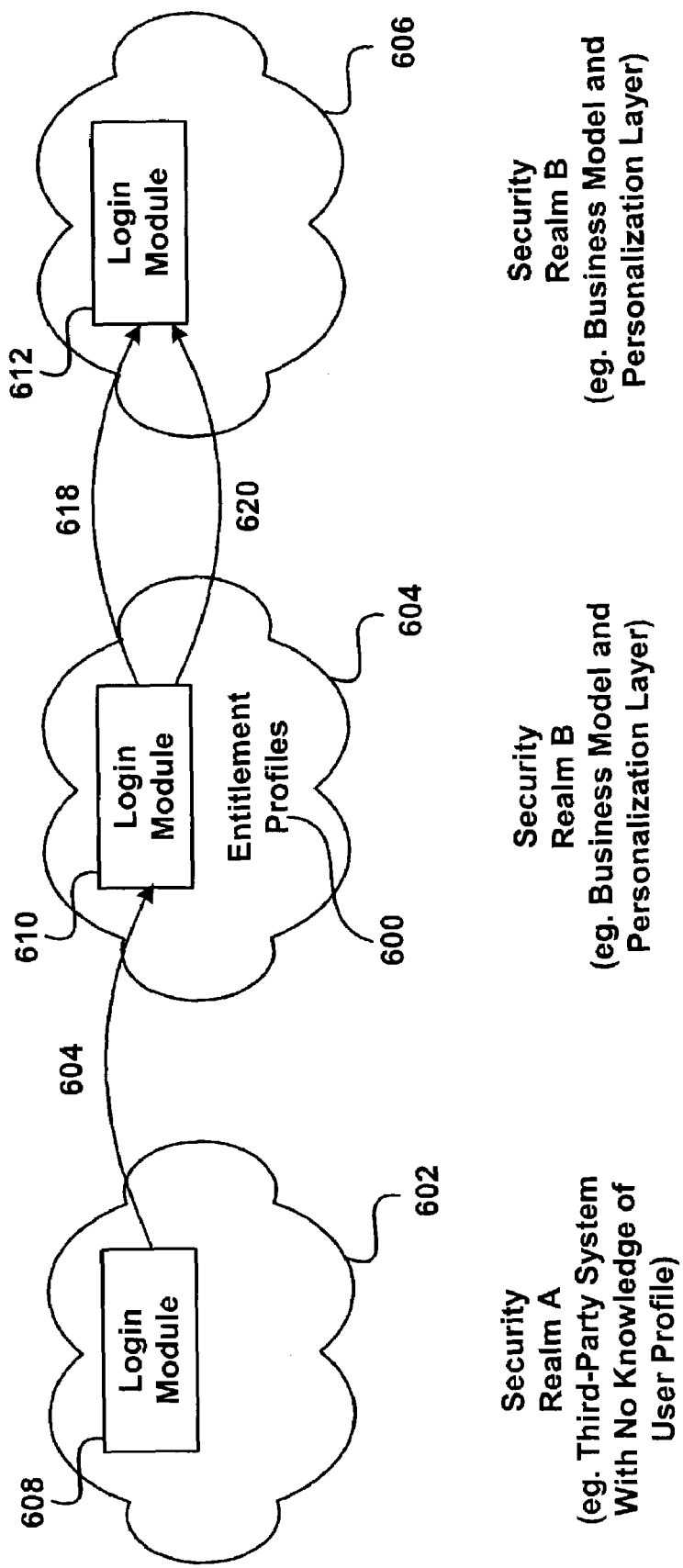
FIG. 6 is a diagram showing multiple security realms that can be used with the security architectures of FIGS. 3 and 4.

An Authorization SPI can provide for Access Decision, for which there is no Java equivalent sufficient. The Authorization SPI can support a variety of authorization models, both declarative and rules-based. A callback handler can be used to obtain access to invocation context. The SPI can also provide access to subject information, including principal identities, group membership and role assignments, and user profile information (optional). Multiple Access Decision providers can be configured in stack. The responsibilities of the Authorization SPI can include making authorization decision of permit, deny, or abstain, or access requests for protected resources scoped by application. FIG. 6 illustrates an example of how profile information can be distributed between security realms 602, 604, 606 within a domain.Principal—>Role Mapping SPI.

A Principal—>Role Mapping (JAAS LoginModule) SPI can be based on a JMS Login Module, and can be used to dynamically map roles to the identities of the principals contained in the Subject. The roles may have been explicitly defined by an administrator or from a deployment descriptor, or they may be dynamically computed based on the parameters fo the business request, the value of attributes in a principal's profile, as well as other conditions.

Principal—>Credential Mapping SPI

A Principal—>Credential Mapping (JAAS LoginModule) SPI can be based on the JAAS Login Module, and can be used to map principal identity when cross security domain policy or technology boundaries. The responsibilities of the Principal Mapping SPI is based on the Subject provided, and can be used to add public credentials with appropriate information to subject, such as password credential for username/password, and generic credential for token-type credentials.

Migrating Data

Special care should be taken when migrating data between application server domains and different EIS instances, as application views defined against one EIS instance can contain identifiers and data specific to that instance. This can also be true of a connection factory used by the application view. A user may not be able to manually change instance-specific data in an application view or connection factory. These changes can, however, be made from an application view console by navigating to, and editing, the desired application view. The user can identify and update all EIS-specific data in the application view, as well as any events, services and associated connection factories.

Any references specific to an EIS instance can be replaced with references to a new EIS instance in the target environment. In particular, the user can edit the application view and connection factory definitions. Application view definitions may need changes in a parameter, such as "EventRouterURL" for example, that can be accessed through an application view "deploy" screen. This parameter can be used to refer to the event router in the target environment. Changes may also need to be made to parameters in the corresponding service definitions. These definitions can include adapter-specific data that refers to the EIS instance-specific data.

An editing feature can be used to change any EIS instance-specific parameters for the service. Event definition parameters may also need to be changed, which contain adapter-specific data that refers to the EIS-instance-specific data. Each adapter can place different properties into a service and event.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for restricting access to an enterprise information system for a validated system user, comprising:

a computer including an application server running thereon;

an intermediate abstraction layer at the application server, including an application view component that provides an interface between a client application and an enterprise information system, and allows the client application to communicate requests for resources to the enterprise information system;

a security service in communication with the intermediate abstraction layer that, for each request from the client application for a particular resource at the enterprise information system, determines an entitlement and an initiating security principal for the request;

a plurality of J2EE Connector Architecture (JCA) resource adapters within the intermediate abstraction layer, that are adapted to receive the requests from the application view component and to subsequently communicate the requests to the enterprise information system, wherein each of the plurality of resource adapters is associated with a specific resource offered by the enterprise information system, and wherein each resource uses its own resource appropriate principal, and wherein each of the plurality of resource adapters includes a security principal map that is used by the security service to map the initiating security principal used by the client application to the resource-appropriate security principal used by the enterprise information system for that resource; and wherein the application server upon receiving a request from a client application to access a resource at the enterprise information system, first validates the user using the security service, and then uses an appropriate adapter together with the security principal map of the appropriate adapter to map the initiating security principal to the resource-appropriate principal, before sending the request to the enterprise information and thereafter using the resource appropriate principal to access the resource, wherein the application view uses XML as a common language among client applications, and wherein XML-encoded service and event definitions are used to expose application capabilities, wherein XML schemas can be used to define the data for services and events between the client applications and the enterprise information system.

2. A system according to claim 1, wherein:
the resource adapter is further adapted to invoke functionality in the resource and expose that functionality through the application view component.

3. A system according to claim 1, wherein:
the application view component further provides a self-describing interface to services and events in the resource.

4. A system according to claim 1, further comprising:
a resource consisting of an enterprise system.

5. A system according to claim 1, wherein:
the application view component is specific to the resource adapter.

6. A system according to claim 1, wherein:
the application view component is further adapted to allow the setting and management of multiple levels of access and security in configuring a security principal.

7. A system according to claim 1, further comprising:
an application component adapted to validate a user as a validated system user.

8. A system according to claim 1, further comprising:
an application integration service adapted to run as a security principal for the application view component.

9. A system according to claim 1, further comprising:
a ConnectionSpec object adapted to be used by the application view component to set credentials for the resource.

10. A method for restricting access to a resource for a validated system user, comprising the steps of:
providing a computer including an application server running thereon;
providing an intermediate abstraction layer at the application server, including an application view component that operates that provides an interface between a client application and an enterprise information system, and allows the client application to communicate requests for resources to the enterprise information system;
providing a security service in communication with the intermediate abstraction layer that, for each request from the client application for a particular resource at the enterprise information system, determines an entitlement and an initiating security principal for the request;
providing a plurality of J2EE Connector Architecture (JCA) resource adapters within the intermediate abstraction layerjhat are adapted to receive the requests from the application view component and to subsequently communicate the requests to the enterprise information system, wherein each of the plurality of resource adapters is associated with a specific resource offered by the enterprise information system, and wherein each resource uses its own resource appropriate principal, and wherein each of the plurality of resource adapters includes a security principal map that is used by the security service to map the initiating security principal used by the client application to the resource-appropriate security principal used by the enterprise information system for that resource; and receiving a request from a client application at the application server to access a resource at the enterprise information system, using the security service to validate the user, and then using an appropriate adapter together with the security principal map of the appropriate adapter to map the initiating security principal provided by the security service to the resource-appropriate principal, and to thereafter use the resource appropriate principal to allow the client application to access the resource, wherein the application view uses XML as a common language among client applications, and wherein XML-encoded service and event definitions are used to expose application capabilities, wherein XML schemas can be used to define the data for services and events between the client applications and the enterprise information system.

11. A method according to claim 10, further comprising:
invoking functionality in the resource and exposing that functionality through the interface.

12. A method according to claim 10, further comprising:
setting and managing of multiple levels of access and security to be used in configuring a security principal.

13. A method according to claim 10, further comprising:
validating a user as a validated system user.

14. A system for providing secure access to a resource at an enterprise information system, comprising:
a computer including an application server running thereon; an intermediate abstraction layer at the application server, including an application view component that provides an interface between a client application and an enterprise information system, and allows the client application to communicate requests for resources to the enterprise information system;
a security service in communication with the intermediate abstraction layer that operates within the application server, and that for each request from the client application for a particular resource, determines an entitlement and an initiating security principal for the request;
a plurality of J2EE Connector Architecture (JCA) resource adapters within the intermediate abstraction layer, that are adapted to receive the requests from the application view component and to subsequently communicate the requests to the enterprise information system, wherein each of the plurality of resource adapters is associated with a specific resource offered by the enterprise information system, and wherein each resource uses its own resource appropriate principal, and wherein each of the plurality of resource adapters includes a security principal map that is used by the security service to map the initiating security principal used by the client application to the resource-appropriate security principal used by the enterprise information system for that resource; and wherein the application server upon receiving a request from a client application to access a resource, validates the user using the security service, and then uses an appropriate adapter for the resource, together with the security principal map of the appropriate adapter to map the initiating security principal provided by the security service to the resource-appropriate principal, and to use the resource-appropriate principal to communicate the request to the resource wherein the application view uses XML as a common language among client applications, and wherein XML-encoded service and event definitions are used to expose application capabilities, wherein XML schemas can be used to define the data for services and events between the client applications and the enterprise information system.

15. The system of claim 14 wherein the application container is an Enterprise Java Beans ENTERPRISE JAVA-BEANS container as defined by the ENTERPRISE JAVA-BEANS specification.

16. The system of claim 14 wherein the security service further comprises a plurality of access decision devices that define an access policy, and wherein each of the plurality of access decision devices can determine its own contributory decision to permit, deny, or abstain from allowing the access request.

17. A method of providing secure access to a resource at an enterprise information system, comprising the steps of:
   starting an application server environment;
   providing an intermediate abstraction layer at the application server, including an application view component that operates provides an interface between a client application and an enterprise information system, and allows the client application to communicate requests for resources to the enterprise information system;
   operating a security service in communication with the intermediate abstraction layer that for each request from the client application for a particular resource, determines an entitlement and an initiating security principal for the request;
   providing a plurality of J2EE Connector Architecture (JCA) resource adapters within the intermediate abstraction layer, that are adapted to receive the requests from the application view component and to subsequently communicate the requests to the enterprise information system, wherein each of the plurality of resource adapters is associated with a specific resource offered by the enterprise information system, and wherein each resource uses its own resource appropriate principal, and wherein each of the plurality of resource adapters includes a security principal map that is used by the security service to map the initiating security principal used by the client application to the resource-appropriate security principal used by the enterprise information system for that resource; and
   wherein the application server upon receiving a request from a client application to access a resource, validates the user using the security service, and then uses an appropriate adapter for the resource, together with the security principal map of the appropriate adapter to map the initiating security principal provided by the security service to the resource-appropriate principal, and to use the resource-appropriate principal to communicate the request to the resource, wherein the application view uses XML as a common language among client applications, and wherein XML-encoded service and event definitions are used to expose application capabilities, wherein XML schemas can be used to define the data for services and events between the client applications and the enterprise information system.

18. The method of claim 17 wherein the application container is an Enterprise Java Beans ENTERPRISE JAVA-BEANS container as defined by the ENTERPRISE JAVA-BEANS specification.

19. The method of claim 17 wherein the security service further comprises a plurality of access decision devices that define an access policy, and wherein each of the plurality of access decision devices can determine its own contributory decision to permit, deny, or abstain from allowing the access request.

* * * * *

UNITED STATES PATENT AND TRADEMARK OFFICE
CERTIFICATE OF CORRECTION

PATENT NO. : 7,546,462 B2
APPLICATION NO. : 10/271215
DATED : June 9, 2009
INVENTOR(S) : Mitch Upton It is certified that error appears in the above-identified patent and that said Letters Patent is hereby corrected as shown below:

On the Title Pg Item (56), on page 3, under "Other Publications", line 43, delete "wi" and insert -- with --, therefor.

On the Title Pg Item (56), on page 4, under "Other Publications", line 26, delete ".prg" and insert -- .org --, therefor.

In column 1, line 28, delete "INTEGRATIONS" and insert -- INTEGRATION --, therefor.

In column 8, line 23, delete "applicatgionView" and insert -- applicationView --, therefor.

In column 8, line 39, delete "setStringInForst" and insert -- setStringInFirst --, therefor.

In column 16, line 59, delete "JMS" and insert -- JAAS --, therefor.

In column 17, line 38, delete "JMS" and insert -- JAAS --, therefor.

In column 19, line 57, in claim 10, delete "layerjhat" and insert -- layer, that --, therefor.

Signed and Sealed this

First Day of June, 2010

David J. Kappos
*Director of the United States Patent and Trademark Office*